United States Patent

Botzelmann et al.

[11] Patent Number: 6,158,538
[45] Date of Patent: Dec. 12, 2000

[54] BATTERY CARRIER FOR A TRACTION BATTERY OF AN ELECTRIC VEHICLE

[75] Inventors: Herbert Botzelmann, Remshalden; Falk-Hagen Braemig, Herrenberg; Konrad Eipper, Ammerbuch; Peter Gere, Owen; Oskar Weiss, Althengstett, all of Germany

[73] Assignee: DaimlerChrysler AG, Stuttgart, Germany

[21] Appl. No.: 09/146,143

[22] Filed: Sep. 3, 1998

[30] Foreign Application Priority Data

Sep. 4, 1997 [DE] Germany .......................... 197 38 620

[51] Int. Cl.[7] .................................................. B60R 16/04
[52] U.S. Cl. .......................................... 180/68.5; 180/65.1
[58] Field of Search ................................ 180/68.5, 65.1; 267/139, 182

[56] References Cited

U.S. PATENT DOCUMENTS

| | | | |
|---|---|---|---|
| 4,174,014 | 11/1979 | Bjorsten | 180/68.5 |
| 4,365,681 | 12/1982 | Singh | 280/68.5 |
| 5,351,791 | 10/1994 | Rosenzweig . | |
| 5,476,151 | 12/1995 | Tsuchida et al. | 180/274 |
| 5,518,271 | 5/1996 | Bell | 280/806 |
| 5,555,950 | 9/1996 | Harada et al. | 180/65.1 |

FOREIGN PATENT DOCUMENTS

| | | | |
|---|---|---|---|
| 0 559 176 B1 | 5/1996 | European Pat. Off. . | |
| 574281 | 12/1993 | France | 180/68.5 |
| 3141164 | 4/1983 | Germany | 180/68.5 |
| 2522844 | 12/1993 | Germany | 180/68.5 |
| 195 04 031 A1 | 8/1996 | Germany . | |
| 196 27 061 A1 | 11/1996 | Germany . | |
| 6-48185 | 2/1994 | Japan | 180/68.5 |
| 07323737 | 12/1995 | Japan . | |

*Primary Examiner*—J. J. Swann
*Assistant Examiner*—James S. McClellan
*Attorney, Agent, or Firm*—Evenson, McKeown, Edwards & Lenahan, P.L.L.C.

[57] ABSTRACT

A battery carrier for a traction battery of an electric vehicle includes a battery container which is fastened to the vehicle body by holding devices that are clamped around a longitudinally extending sliding tube mounted on the vehicle body. The sliding tube is displaceable relative to the holding devices along a limited distance in the axial direction, so that the battery container can be accelerated relative to the vehicle body in the event of a frontal impact. Energy absorbing devices for controlling the transmission of kinetic energy from the battery container to the vehicle body, while partially consuming energy, may be formed by deformation tubes which are arranged on the sliding tube, and are made, for example, of a fiber composite material.

14 Claims, 2 Drawing Sheets

BATTERY CARRIER FOR A TRACTION BATTERY OF AN ELECTRIC VEHICLE

BACKGROUND AND SUMMARY OF THE INVENTION

This application claims the priority of 197 38 620.2, filed Sep. 4, 1997, the disclosure of which is expressly incorporated by reference herein.

The invention relates to a battery carrier for a traction battery of an electric vehicle, which is constrained against extreme movements in the case of a vehicle crash.

In order to achieve a sufficient traveling range, electric vehicles must be provided with large traction batteries, which may have a mass of several hundred kilograms. Battery fastening therefore becomes very significant. Because the body structure of an electric vehicle is comparable to that of a conventional vehicle with an internal combustion engine, the additional weight due to high battery mass adversely affects crash safety unless special measures are taken. With the same deformation resistance of the vehicle front end as in the case of the internal combustion engine vehicle, particularly in the initial phase (0—approximately 30 ms) of the crash progression which is important for the sensor system, the additional mass results in a drop of the characteristic deceleration curve. That is, in the event of a crash, the vehicle decelerates more slowly; and as a result, triggering of the belt tightening devices and of the air bags is delayed, so that the occupant restraint is impaired.

In order to solve this problem, European Patent Document EP 0 559 176 B1 discloses an arrangement in which the battery is disposed displaceably in the vehicle. That is, as the result of deceleration which occurs during a frontal impact, the battery carrier may be displaced in the direction of the longitudinal axis of the vehicle. At the same time, by means of energy absorbing devices, kinetic energy of the battery container is transmitted to the vehicle body in a controlled manner, while partially consuming energy.

In this arrangement, a free-running path is provided so that, after the impact, the battery carrier essentially runs free with respect to the vehicle body along a predetermined path. As a result, at the start of a crash, the battery mass is uncoupled from the vehicle for a short time, during which it has no influence on the characteristic deceleration curve. Because the triggering decision is made within this free-running time interval defined by the free-running path, no additional adaptation measures are required for the electric vehicle with respect to the front end structure or the triggering action in order to achieve the same occupant restraint as in the case of the internal combustion engine vehicle.

The free-running path in this case is formed by guiding devices constructed as oblong holes in which fastening screws are guided for fastening the battery carrier to the vehicle body, so that the battery container is longitudinally displaceable. Flat steel strips are provided as energy absorbing devices for braking the displacement. These strips run through narrow eyes whose width is such that they are deformed only after passing through the free-running path, for the purpose of consuming energy.

It is an object of the invention to provide an alternative to the battery carrier of the type described above.

This and other objects and advantages are achieved by the battery carrier arrangement according to the invention, in which the guiding device consists of at least one sliding tube or shaft which extends in the longitudinal direction of the vehicle body. Holding devices for fastening the battery container on the vehicle body reach around and clamp onto the sliding tube so that the battery container is held. In the event of a release and movement of the battery container, the sliding tube can be displaced relative to the holding devices in the axial direction for a limited distance.

In principle, the sliding tube can be fixed to the vehicle and the battery container can be displaceably disposed on the sliding tube by means of holding devices; or on the other hand, the sliding tube can be fastened to the battery container, with the holding devices for the sliding tube slidably fastened to the vehicle body. Mixed arrangements are also conceivable.

In a preferred embodiment sliding tubes are provided on both sides of the battery container, and can be used as holding grips during handling of the battery carrier.

Other objects, advantages and novel features of the present invention will become apparent from the following detailed description of the invention when considered in conjunction with the accompanying drawings.

DETAILED DESCRIPTION OF THE DRAWING

Figure 1:
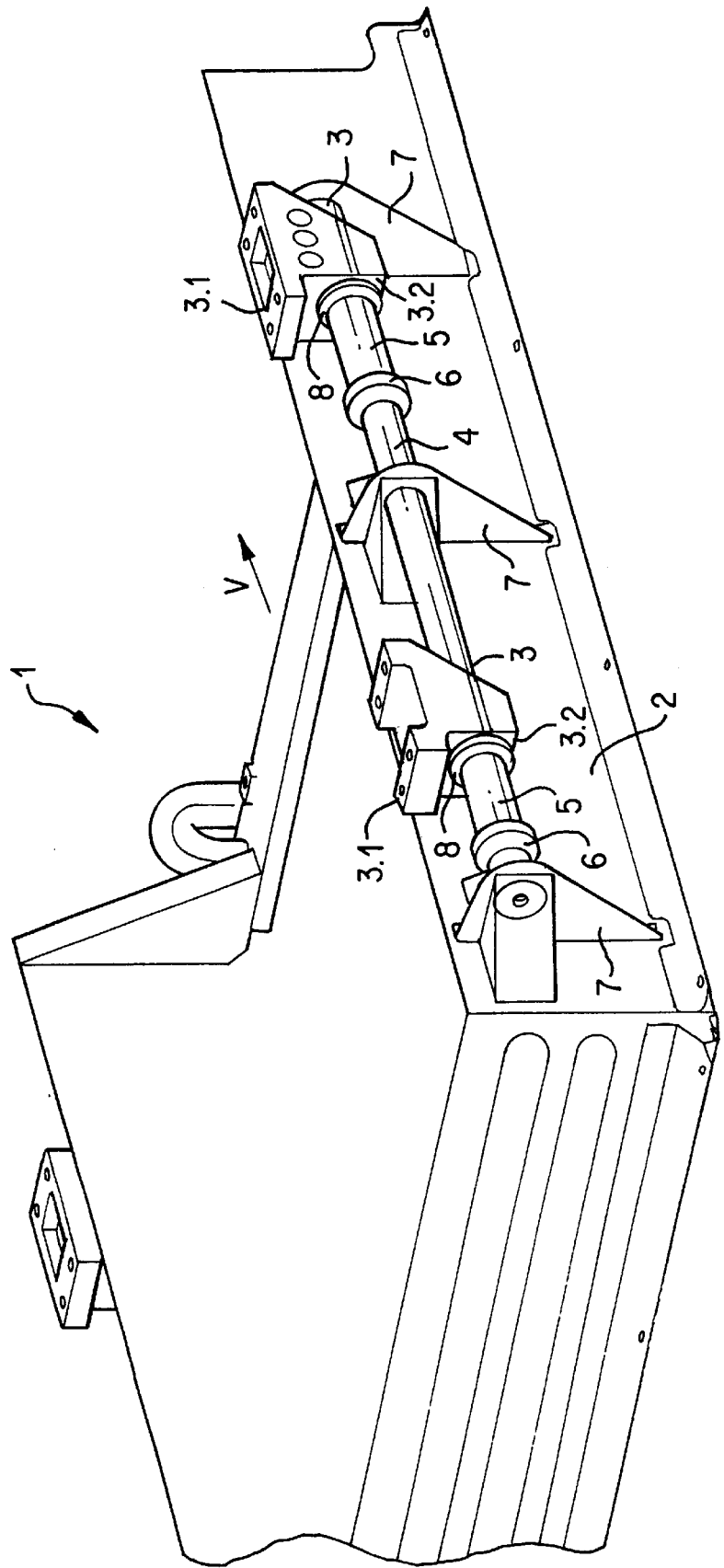
FIG. 1 is a perspective view of the battery carrier according to the invention with a preferred embodiment of the energy absorbing device.

The preferred embodiment in FIG. 1 shows the battery carrier 1 according to the invention for a traction battery of an electric vehicle. In the illustrated lateral view of the battery carrier 1, only one longitudinal side is visible; the other longitudinal side has a corresponding construction.

The battery carrier 1 comprises a battery container 2 for receiving the traction battery (not shown). For fastening the battery carrier 1 to the vehicle body, the holding devices 3, which are adapted to be fixedly attached to the vehicle body, reach around and are slidably mounted on a sliding tube 4. The latter in turn is fixedly connected with the battery container 2 by means of holding webs 7, and extends in the longitudinal direction of the vehicle, so that the battery container 2 is held.

In FIG. 1, the longitudinal direction of the vehicle corresponds to the arrow which marks the forward speed v. In the event of an impact, the battery container 2 experiences an acceleration force in the illustrated direction of the arrow which is proportional to the battery mass. Since the sliding tube 4 can be displaced relative to the holding devices 3 into the axial direction along a limited distance (because it slides through the holding devices 3), the battery container 2 can be accelerated by the acceleration force in the direction of the arrow relative to the vehicle body. The sliding tube 4 is simultaneously used as a guiding device in order to limit movement of the battery container 2 to the longitudinal direction of the vehicle in the event of an impact.

The holding devices 3 perform a movement limiting function via upper and lower clamping jaws 3.1, 3.2, which extend around the sliding tube, and clamp it in a frictionally engaging manner in the axial direction. The clamping pressure onto the sliding tube can be adjusted by means of fastening screws between the clamping jaws 3.1, 3.2, to limit the movement of the battery container 2 relative to the vehicle body, in that axial displacement of the sliding tube 4 is permitted relative to the holding devices 3 (and thus a movement of the battery container 2 is released relative to the vehicle body), only in the event of an impact having at least a predetermined impact intensity which overcomes the frictional engagement. Furthermore, it is also possible to provide shear pins as the movement limiting devices instead of or in addition to the clamping jaws 3.1, 3.2.

In addition, the battery carrier 1 also includes energy absorbing devices for controlled transmission of kinetic energy from the battery container 2 to the vehicle body while at least partially consuming energy. In the embodiment, the energy absorbing devices are formed by at least one deformation tube or sleeve 5 which is pushed onto the sliding tube 4. (All tubes which can be shortened under compressive strain in the longitudinal direction while consuming energy are suitable for use as a deformation tube.) The deformation tube 5 is clamped between a holding device 3 and a clamping disk 6 which is immovably fastened to the sliding tube 4. Thus shortening of the deformation tube 5 commences upon the start of a released movement of the battery container 2 along the limited distance. Preferably, the deformation tube 5 is fixedly connected with the clamping disk 6 by means of gluing, clamping or another form closure to prevent uncontrolled rattling of the deformation tube 5. For example, the clamping disk 6 may be constructed as a bushing which receives one end of the deformation tube 5. Preferably, a stop ring 8 is provided on the holding device 3, which stop ring 8 forms a stop of a defined surface for the other end of the deformation tube 5.

The deformation tubes 5 may be formed, for example, by fiber composite tubes which are destroyed when subjected to a high compressive strain, shortening in the process in a defined manner without bursting open. Fiber composite tubes can be produced, for example, by means of a known winding process or an extrusion process. The matrix material may, for example, be thermoplastic or duroplastic. The following fibers may, for example, be used: Glass, aramide, carbon, natural materials or synthetic fibers. Suitable metallic tubes may also be used as deformation tubes 5 which absorb deformation energy by means of denting. The deformation tube 5 can also be constructed as a folding or collapsing tube (FIG. 2), in the case of which energy is destroyed not by a destruction or denting but by a widening and folding or collapsing of the tube.

In order to permit simple and convenient access to the traction battery disposed in the battery container 2, the whole battery carrier 1 can be separated from the vehicle body by releasing the clamping jaws 3.1, 3.2. To exchange the deformation tubes 5, the sliding tube 4 can be released and pulled out through the holding webs 7 and holding devices 3, so that the deformation tubes 5 can be removed and replaced.

In FIG. 1, the energy absorbing device with the deformation tubes 5 can be constructed such that an energy-consuming effect begins immediately at the start of movement of the battery container 2. In this case, the progression of the energy consumption can be affected by the construction of the deformation tube 5. In the case of a fiber composite tube, for example, as the result of the winding density, the shortening resistance may be constructed such that the energy consumption will rise slowly at first, and then faster.

As an alternative, the deformation tubes 5 can be made shorter than the theoretically existing distance between the clamping disk 6 and the holding device 3, so that a free-running path is formed. If several such deformation tubes are provided along a sliding tube (in FIG. 1, two deformation tubes are provided), by the selection of different lengths for the deformation tubes (and therefore of the free-running distances), an energy consumption can be achieved which rises in steps with the shortening.

Figure 2:
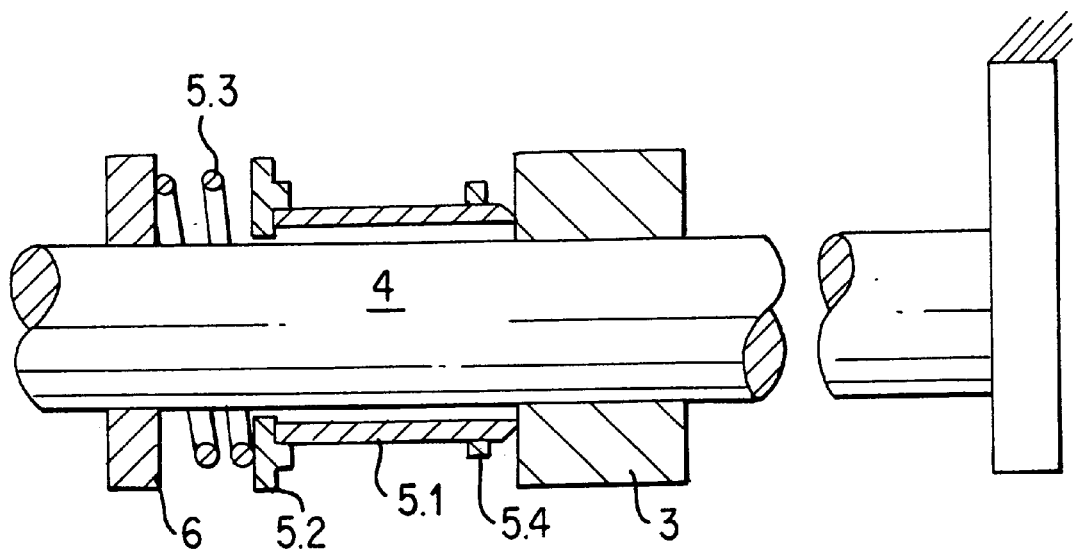
FIG. 2 is a partial view of a second embodiment of the energy absorbing device.

FIG. 2 shows a cutout of the sliding tube 4 with a second embodiment of the energy absorbing device which is clamped in between the holding device 3 (connected with the vehicle body) and the clamping disk 6, which is welded or otherwise fixedly attached to the sliding tube 2. The energy absorbing device comprises a deformation tube 5.1 which is supported on one end by means of a holding disk 5.2 by way of a spring element 5.3 against the clamping disk 6. The spring element 5.3 may be a coil spring, an elastic intermediate layer or a flat spring. On the one hand, it is used to prevent rattling of the deformation tube 5.1 during driving. On the other hand, when designed correspondingly, it can be used to provide a reversible, no-destruction energy consumption feature on the short displacement path between the clamping disk 6 and the holding disk 5.2, which is operative before the start of the energy consumption by means of the energy absorbing device 5.1.

So that the deformation tube 5.1 will not break open during the starting impact-caused deformation (in which case it would then no longer reduce energy), depending on the material and the manufacturing of the tube, particularly in the case of fiber composite tubes manufactured by extruding, it may be necessary to provide a sliding ring 5.4 in the deformation area of the deformation tube 5.1. This sliding ring 5.4 is displaced as the destruction of the deformation tube 5.1 progresses and ensures a uniform destruction of the tube.

Figure 3:
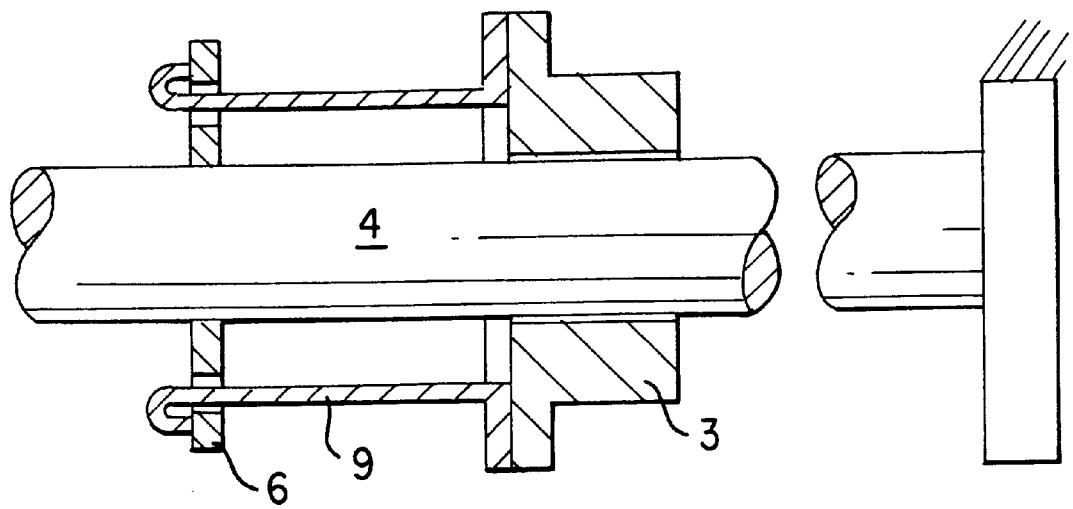
FIG. 3 is a view of a third embodiment of the energy absorbing device.

FIG. 3 shows the construction of the energy absorbing device with a folding tube 9 made of a metallic material. The folding tube 9 is welded to the clamping disk on the side facing away from the folding tube (as in FIG. 2) or is screwed together by way of plates, in order to ensure a uniform widening and folding or collapsing.

The battery carrier according to the invention was conceived with respect to absorbing a frontal impact. Analogously, energy absorbing devices and clamping disks may be arranged such that a rear impact is absorbed. A combination is also conceivable.

The sliding tubes need not necessarily extend horizontally along the vehicle axis, but may instead extend diagonally, so that more displacement path can be made available to a released movement of the battery container. If sufficient installation space is available, the slope can be selected such that, in the event of an impact-caused displacement, the battery container is raised upward, so that additional energy would be absorbed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Battery carrier for a traction battery of an electric vehicle, comprising a battery container for receiving the traction battery, holding devices for fastening the battery container to the vehicle body, movement limiting devices which release the battery container for movement relative to the vehicle body only in the event of an impact having at least a predetermined impact intensity, guiding devices which, in the event of an impact, limit movement of the battery container to a longitudinal direction of the vehicle, and energy absorbing devices for the controlled transmission of kinetic energy from the battery container to the vehicle body while at least partially absorbing energy, wherein:

the guiding devices comprise at least one sliding tube which extends in the longitudinal direction to the vehicle body;

the holding devices, for fastening the battery container to the vehicle body, extend around the sliding tube and hold the battery container; and the sliding tube is displaceable in the axial direction relative to the holding devices along a limited distance, in the event of a released movement of the battery container.

2. Battery container according to claim 1, wherein:

the energy absorbing devices comprise at least one deformation tube which is arranged on the sliding tube and which is longitudinally deformable when affected by compressive strain in the longitudinal direction, thereby consuming energy; and the deformation tube is arranged such that, in the course of the released movement of the battery container along the limited distance, the deformation tube is clamped between one of said holding devices and a clamping disk fastened to the sliding tube.

3. Battery carrier according to claim 2, wherein:

at least one sliding tube is immovably fastened to the battery container by means of holding webs; and the holding devices are fastened to the vehicle body.

4. Battery carrier according to claim 3, wherein each holding device has upper and lower clamping jaws which extend around and clamp the sliding tube, in a frictionally engaged manner, permitting axial displacement of the sliding tube relative to the holding devices only above a defined impact intensity, whereby said upper and lower jaws also form the movement limiting devices.

5. Battery carrier according to claim 2, wherein the deformation tube is constructed and dimensioned such that an energy-consuming effect commences immediately with the start of the movement of the battery container.

6. Battery carrier according to claim 5, wherein the deformation tube is constructed such that, as the shortening increases, the energy consumption will at first rise slowly and then rapidly.

7. Battery carrier according to claim 5, wherein the deformation tube is formed of a fiber composite material.

8. Battery carrier according to claim 5, wherein the deformation tube is constructed as a folding tube.

9. Battery carrier according to claim 2, wherein at least one deformation tube is constructed to be shorter than the distance between the clamping disk and the holding device.

10. Battery carrier according to claim 2, wherein the deformation tube is supported on one end by means of a holding disk by way of a spring element against the clamping disk.

11. A mounting arrangement for a battery in an electric vehicle, comprising:

a battery container;

at least one linear sliding tube for mounting in a direction aligned with a longitudinal axis of said vehicle;

at least one first coupling device coupling said battery container onto said at least one sliding tube;

at least one second coupling device adapted to be fixedly connected to a body of said vehicle, and coupling said at least one sliding tube to said body;

wherein at least one of said first and second coupling devices is slidably mounted on said sliding tube and frictionally engaged therewith, permitting linear translatory movement of said battery container along said sliding tube in said direction aligned with the longitudinal axis of the vehicle, only upon an impact having at least a predetermined intensity.

12. A mounting arrangement for a battery in an electric vehicle according to claim 11 wherein said at least one of said first and second coupling devices which is slidably mounted on said sliding tube comprises first and second jaws which extend around said sliding tube and clamp therearound with an adjustable clamping pressure.

13. A mounting arrangement for a battery in an electric vehicle according to claim 11, further comprising at least one energy absorbing device for controlling a transmission of kinetic energy from the battery container to the vehicle body.

14. A mounting arrangement for a battery in an electric vehicle according to claim 13 wherein said energy absorbing device comprises at least one longitudinally deformable sleeve mounted on the sliding tube and disposed between one first coupling device and one second coupling device, whereby said sleeve is longitudinally deformed upon sliding movement by one of said first and second coupling devices relative to said sliding tube.

* * * * *